July 30, 1929.  M. F. WATERS  1,722,870
BAFFLE
Filed Aug. 15, 1927
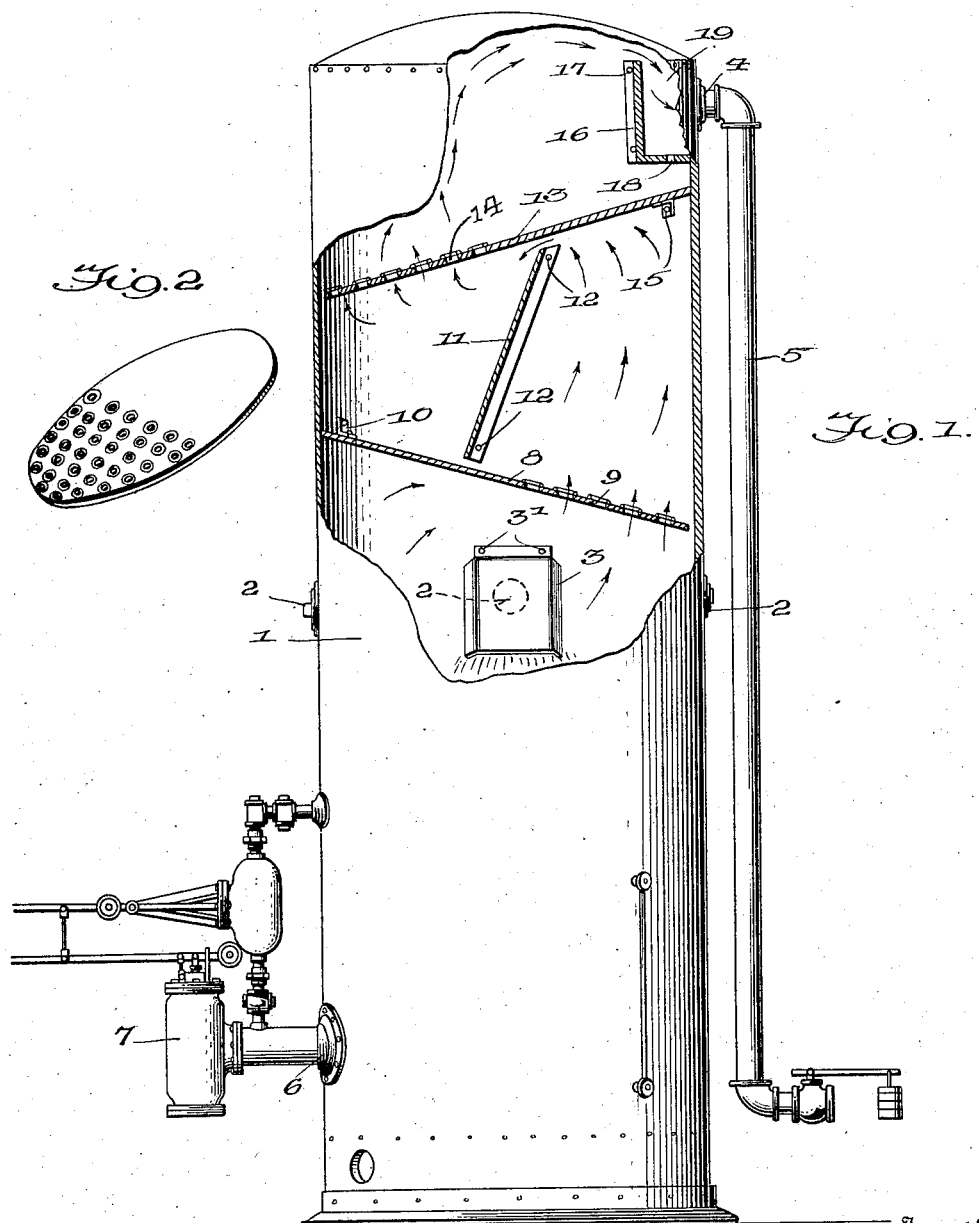
Inventor
M. F. WATERS,
By George A. Prevost
Attorney Patented July 30, 1929.

1,722,870

UNITED STATES PATENT OFFICE.

MILLARD F. WATERS, OF TULSA, OKLAHOMA, ASSIGNOR TO SMITH SEPARATOR COMPANY, OF TULSA, OKLAHOMA.

BAFFLE.

Application filed August 15, 1927. Serial No. 213,118.

My invention consists in new and useful improvement in baffles for oil and gas separators of the type employed to separate gas from oil immediately after a mixture of oil and gas is discharged from the well, and has for its object to provide an arrangement of baffles which will impart a reverse action to the gas, thereby giving the same a thorough scrubbing.

A further object of my invention is to provide the series of inclined baffles arranged in the tank in such a manner that the oil knocked back on the upper surfaces of said baffles will readily flow towards the shell of the tank and down the same to the body of separated oil at the bottom of the tank.

With the above and other objects in view which will appear as the description proceeds, my invention consists in the novel features herein set forth, illustrated in the accompanying drawings and more particularly pointed out in the appended claims.

Referring to the drawings,

Fig. 1 is a view in side elevation, partly broken away, showing my improved baffle arrangement in cross section, and Fig. 2 is a detailed perspective view of one of the inclined baffles.

In the drawing, 1 represents a closed tank having a plurality of oil and gas inlets 2, through which the oil and entrained gas may be fed into the tank. These inlets are arranged substantially midway of the height of the column, and at the point where these inlets occur, the column is provided interiorly with downwardly and centrally inclined baffles 3, secured to the tank by rivets or the like as shown at 3'. 4 represents a gas outlet in the shell of the tank 1 at its upper extremity, connecting into a gas line 5 on the outside of said tank. In the lower portion of the tank I provide an oil outlet 6, controlled by a suitable float and valve arrangement 7, which form no part of the present invention.

In the upper portion of the tank 1, above the inlet 2, I secure an inclined baffle 8, by means of riveted L's 10 or any other suitable means. The lower half of this inclined baffle 8 is apertured as at 9, the upper surface of said perforated portion being provided with raised lips which extend entirely around each of said apertures 9, for the purpose hereinafter set forth.

11 represents an angularly disposed solid plate or baffle, extending entirely across tank 1, centrally thereof, and secured in place to the shell of said tank by rivets 12 or other suitable means. The lower edge of this baffle is slightly spaced apart from the upper surface of the inclined baffle 8, allowing a slight clearance between the two.

Above the solid baffle 11, and spaced apart from the upper edge thereof, I provide a second inclined baffle 13, similar in all respects to the first named baffle 8, but inclined in the opposite direction, being secured in place by L's 15. The apertures 14 of the baffle 13 are directly above the solid portion of the baffle 8, and the solid portion of the baffle 13 is directly above the apertured portion of the baffle 8, for the purpose hereinafter set forth.

Directly above the upper edge of the inclined baffle 13, I provide a solid baffle 16, substantially L-shaped in cross section, as clearly shown in Fig. 1. This baffle is secured to the shell of the tank 1 by rivets 17, and is directly adjacent to the gas outlet 4, forming an outlet chamber 19 open at its upper extremity to the upper portion of the tank, and provided in its bottom with a small aperture 18, serving as a drain for any condensation in said chamber.

The operation of my improved oil and gas separator is as follows:

The oil and entrained gas enter the tank at the inlet 2, immediately coming in contact with the angular baffles 3, which cause the same to be deflected downwardly towards the lower portion of the tank, the oil continuing its downward passage and the gas rising. As the gas rises, it carries with it a certain quantity of entrained oil, the greater portion of which is knocked back when the gas comes in contact with the under surface of the inclined baffle 8, which due to its inclination imparts a reverse action to the gas and causes the same to be scrubbed along the under surface, until it passes upward through the apertures 9 in the lower half of said baffle. From these apertures the gas continues its upward passage until its contact with the lower surface of the second inclined baffle 13, which again causes a reverse action to be imparted to the gas, the solid baffle 11, preventing the gas from immediately passing to the apertures 14 in said inclined baffle 13. After being thoroughly scrubbed along the under surface of said baffle 13, and passing through the space arranged between the baffles 11 and 13, the gas passes upwardly through the apertures 14 into the head of the tank 1, from whence it finds its way into the chamber 19 formed by the baffle 16, and out through the gas outlet 4. Any condensate which may occur in the chamber 19 is immediately drained out through the aperture 18 on to the upper surface of the inclined baffle 13, running down said baffle by gravity to the lower edge thereof, which as before stated is spaced apart from the shell of the tank, permitting said liquid to flow downwardly along the shell of said tank.

It will be noted that the lips encircling the apertures 9 and 14 cause the downflowing oil, knocked back from the head of the tank 1 on the upper surface of the baffle 13, and from the lower surface of the baffle 8, on to the upper surface of the baffle 13, the flow around said apertures, thus preventing any interference with the upflowing gas passing through said apertures, and allowing said oil to pass freely between the spaced lower edges of said baffle and the tank 1, from whence it seeks the oil level at the bottom of said tank.

From the foregoing it is believed that my invention may be clearly understood by those skilled in the art, without further description, it being borne in mind that numerous changes may be made in the details of construction without departing from the spirit of the invention as set forth in the following claims.

What I claim and desire to secure by Letters Patent is:

1. In an oil and gas separator a series of baffles comprising an inclined plate, perforated throughout a portion of its area, a second plate inclined in the opposite direction, above said first named plate, said second plate being perforated throughout a portion of its area opposed to the imperforate area of said first plate, and a baffle interposed between said plates and angularly disposed with respect thereto, its edges being slightly spaced apart from the adjacent surfaces of said plates forming elongated ports, whereby the gas is throttled in its upward passage.

2. In an oil and gas separator consisting of a tank, a series of baffles comprising an inclined plate mounted within the upper portion of said tank, and perforated throughout a portion of its area, the lowermost edge of said plate being spaced from the shell of said tank, a second plate mounted above said first named plate and inclined in the opposite direction, said second plate being perforated throughout a portion of its area opposed to the imperforate area of said first plate, its lowermost edge being spaced from the shell of said tank, and a solid baffle interposed between said plates and angularly disposed with respect thereto, its edges being slightly spaced apart from the adjacent surfaces of said plates forming elongated ports, whereby the gas in throttled in its upward passage.

3. In an oil and gas separator consisting of a tank, a series of baffles comprising an inclined plate mounted within the upper portion of said tank, and perforated throughout a portion of its area, the lowermost edge of said plate being spaced from the shell of said tank, a second plate mounted above said first named plate and inclined in the opposite direction, said second plate being perforated throughout a portion of its area opposed to the imperforate area of said first plate, its lowermost edge being spaced from the shell of said tank, and a solid baffle interposed between said plates and angularly disposed with respect thereto, its edges being spaced apart from the adjacent surfaces of said plates, and a gas outlet baffle arranged above said series.

4. Apparatus as claimed in claim 3, wherein said gas outlet baffle is mounted directly adjacent the gas outlet of said tank forming an outlet chamber open at its top and having an oil drain in its bottom.

5. In an oil and gas separator consisting of a tank, a series of baffles comprising a substantially circular inclined plate secured to the shell of said tank in the upper portion thereof, the lower half of said plate being perforated, a second substantially circular plate mounted above said first named plate and inclined in the opposite direction, said second plate being perforated throughout the half of its area opposed to the imperforate area of said first plate, the opposite lowermost edges of said plates being spaced from the shell of said tank, a solid baffle extending substantially centrally across said tank between said plates and angularly disposed with respect thereto, its upper and lower edges being spaced apart from the upper and lower plates respectively, and a baffle substantially L-shaped in cross-section arranged adjacent the gas outlet of said tank above said series.

In testimony whereof I affix my signature.

MILLARD F. WATERS.